(12) United States Patent
Sidheswaran et al.

(10) Patent No.: US 10,167,628 B2
(45) Date of Patent: Jan. 1, 2019

(54) SURFACE COATING INCORPORATING PHASE CHANGE MATERIAL

(71) Applicant: Eastman Chemical Company, Kingsport, TN (US)

(72) Inventors: Meera Angayarkanni Sidheswaran, Jonesborough, TN (US); Pruthesh Hariharrao Vargantwar, Kingsport, TN (US); Leslie Sharon Depew, Kingsport, TN (US); Glen Dennis Shields, Kingsport, TN (US); Jennifer Lynn Cogar, Unicoi, TN (US)

(73) Assignee: Eastman Chemical Company, Kingsport, TN (US)

( * ) Notice: Subject to any disclaimer, the term of this patent is extended or adjusted under 35 U.S.C. 154(b) by 332 days.

(21) Appl. No.: 14/963,693

(22) Filed: Dec. 9, 2015

(65) Prior Publication Data

US 2017/0167133 A1    Jun. 15, 2017

(51) Int. Cl.
| | |
|---|---|
| *E04B 1/76* | (2006.01) |
| *C09D 5/26* | (2006.01) |
| *C09D 105/16* | (2006.01) |
| *C09K 5/06* | (2006.01) |
| *C09D 5/32* | (2006.01) |

(52) U.S. Cl.
CPC .................. *E04B 1/76* (2013.01); *C09D 5/26* (2013.01); *C09D 5/32* (2013.01); *C09D 105/16* (2013.01); *C09K 5/063* (2013.01)

(58) Field of Classification Search
CPC .................................. C09D 105/06; C07C 9/15
See application file for complete search history.

(56) References Cited

U.S. PATENT DOCUMENTS

| | | | |
|---|---|---|---|
| 4,259,401 A | 3/1981 | Chahroudi et al. | |
| 2014/0343189 A1* | 11/2014 | Hanzlicek | A61L 2/18 523/102 |
| 2015/0111984 A1* | 4/2015 | San Jose | C07C 233/20 523/122 |

OTHER PUBLICATIONS

ASTM D3418-15; "Standard Test Method for Transition Temperatures and Enthalpies of Fusion and Crystallization of Polymers by Differential Scanning Calorimetry".
(Continued)

*Primary Examiner* — Michael M Dollinger
*Assistant Examiner* — Christina H Wales
(74) *Attorney, Agent, or Firm* — Matthew W. Smith

(57) ABSTRACT

A stable emulsion having a fluid medium; a phase change material (PCM) comprising a straight, branched and/or cyclic aliphatic moiety having from 3 to 18 carbon atoms, polymers, and copolymers having residues of the straight, branched and/or cyclic aliphatic moiety; and a modified cyclodextrin having at least one functional moiety capable of forming a stable emulsion with the PCM in the fluid medium. The invention further includes a modified paint or surface coating having from 10 to 99 weight % of a base coating and from 1 to 90 weight % of the stable emulsion admixed therein.

11 Claims, 2 Drawing Sheets

(56) References Cited

OTHER PUBLICATIONS

Kosny et al.; "Cost Analysis of Simple Phase Change Material-Enhanced Building Envelopes in Southern U.S. Climates"; Jan. 2013; Prepared for the National Renewable Energy Laboratory on behalf of the U.S. Department of Energy's Building American Program, Office of Energy Efficiency & Renewable Energy; NREL Contract No. DE-AC36-08GO28308.

Roy et al.; "Building Materials, Energy Efficiency, and the American Recovery and Reinvestment Act"; The Bridge; National Academy of Engineering; pp. 31-36.

Report—Energy Efficiency in Buildings, 2006-2013, Transforming Markets, World Business Council for Sustainable Development.

\* cited by examiner

US 10,167,628 B2

SURFACE COATING INCORPORATING PHASE CHANGE MATERIAL

BACKGROUND OF THE INVENTION

1. Field of the Invention

The present invention relates to surface coatings incorporating at least one phase change material. More particularly, the present invention is directed to an emulsion useful as a surface coating material incorporating a phase change material comprising a straight, branched and/or cyclic aliphatic moiety having from 3 to 18 carbon atoms and a carrier comprising a cyclic oligosaccharide, and/or a cyclodextrin having at least one functional moiety. The emulsion is useful for coating a surface to enhance thermal energy storage and effect stabilized energy use in buildings or portions that can have varied heating and cooling loads based on time of day and season.

2. Description of the Prior Art

There has been a great deal of interest in phase change thermal energy storage systems due to their inherent ability to store heat energy as temperatures rise above a predetermined level and release the energy back to the surrounding environment as temperatures drop below a predetermined level. Phase change materials have the ability to repetitively convert between solid and liquid phases and utilize the compound's latent heat of fusion to absorb, store and release heat during such phase conversions. These systems are of particular interest in the architectural and building trades where climate control and its concomitant energy consumption is one of the principal considerations in building design and material selection.

The latent heats of fusion are greater than the sensible heat capacities of the materials. For example, in phase change materials, the amount of energy absorbed upon melting or released upon freezing is much greater than the amount of energy absorbed or released upon increasing or decreasing the temperature of the material over an increment of, for example, 1° Centigrade. Upon melting and freezing, per unit weight, a phase change material (PCM) absorbs or releases, respectively, a large quantity of energy proximate to the temperature of its melting/freezing point. This energy is substantially more than what would be absorbed or released using a sensible heat storage material that is heated or cooled over the same temperature range. This is particularly advantageous in buildings where space is at a premium and energy storage and release are required within a very narrow comfort range.

A variety of techniques have previously been used in building materials to save heating or cooling energy costs. One technique is to include phase change materials (PCMs) into the structural elements. By incorporating phase change materials into building materials, energy in excess necessary to maintain comfortable conditions is absorbed and subsequently released when the surrounding environment temperature drops below the comfort range. Thus, in winter months, phase change materials incorporated into structural elements in the ceiling, walls and/or floors of buildings can absorb energy, such as solar and reflected sunlight, during daytime hours and release it to the interior at night as temperatures drop. In summer months, the same phase change material, due to its thermostatic character, conserves coolness by absorbing energy.

Structural elements and compositions incorporating phase change materials are more desirable than elements that only store sensible heat because they have a higher capacity to store energy and they absorb and release a large quantum of energy over a very narrow temperature range.

Phase change materials capable of storing and releasing thermal energy have found many applications in building structures, road base materials, beverage and food containers, medical wraps, and textile applications such as garments.

Previously, both structural and non-structural building materials incorporating phase change materials have been disclosed. These building materials are made up of a rigid porous matrix structure which is impregnated with the phase change material. Three classes of phase change materials are disclosed, namely, hydrated salts, waxes, and clathrates. Cements, plasters or thermosetting materials may form the rigid matrix.

One of the basic problems, however, in the use of solid-to-liquid PCM's for control of temperature, is containment. That is, for heat transfer efficiency as well as safety purposes, it is undesirable to have a thick block or agglomeration of solid phase PCM below the PCM melting point. Similarly, when above the melting point, PCM in liquid phase can be problematic. For instance, building panels containing liquid phase PCM have proven deficient. In one such PCM-containing panel, carpenters reported that a liquid phase PCM leaked out of the panel when nails were driven through it.

It is also known to utilize a phase change energy storage system based on a combination of two inorganic salts together with nucleating and thickening agents that incorporate silica either alone or a powdered product prepared by the vapor phase hydrolysis of a silicon compound reacted with liquid water.

Accordingly, there is a need for a surface coating that has included therein a PCM matrix that allows the PCM to be uniformly applied to a surface of a substrate, such as a wall, heating plenum, molded article, automobile interior, thermoplastic article and many other substrates where temperature moderation would be beneficial.

SUMMARY OF THE INVENTION

Briefly, the present invention is a PCM emulsion comprising: a fluid medium, a phase change material (PCM) and a solid carrier selected from a cyclic oligosaccharide, a cyclodextrin and mixtures thereof wherein the carrier includes at least one functional moiety capable of forming a stable emulsion with the PCM in the fluid medium.

Another aspect of the present invention is for a modified surface coating composition comprising from about 10 to about 99 weight % of a water-based latex coating base having from about 1 to about 90 weight % of a phase change emulsion comprising: a fluid medium, a phase change material (PCM) and a carrier selected from a cyclic oligosaccharide, a modified cyclodextrin and mixtures thereof wherein the carrier includes at least one functional moiety capable of forming a stable emulsion with the PCM in the fluid medium and the latex base coating.

Another aspect of the present invention is for a modified surface coating composition comprising from about 10 to about 99 weight % of an oil-based alkyd coating base having from about 1 to about 90 weight % of a phase change emulsion comprising: a fluid medium, a phase change material (PCM) and a carrier selected from a cyclic oligosaccharide, a modified cyclodextrin and mixtures thereof wherein the carrier includes at least one functional moiety capable of forming a stable emulsion with the PCM in the fluid medium and the alkyd base coating.

Another aspect of the present invention is for a substrate surface have coated thereon a sufficient amount of the modified surface coating composition to absorb/release at least about 226 Joules of energy over a surface area of 400 ft2 in a 24 hour period when the temperature of the surroundings is ±2° of the PCM latent heat of fusion phase change temperature.

These objects can be obtained by the following means:

[1]. A stable emulsion comprising:
 a. a fluid medium;
 b. a phase change material (PCM) comprising straight, branched and/or cyclic aliphatic moiety having from 3 to 18 carbon atoms, polymers, and copolymers comprising residues of said straight, branched and/or cyclic aliphatic moiety; and
 c. a solid carrier selected from the group consisting of a cyclic oligosaccharide, a modified cyclodextrin and mixtures thereof having at least one functional moiety capable of forming a stable emulsion with the PCM in said fluid medium.

[2]. The emulsion of [1], wherein said PCM is selected from the group consisting of paraffin based materials, esters of fatty acids and mixtures thereof.

[3]. The emulsion of [2], wherein said PCM is selected from the group consisting of pentadecane, hexadecane, heptadecane, octadecane, nanodecane, dodecane, icosane, methyl palmitate, ethyl palmitate, and mixtures thereof.

[4]. The emulsion of [2], wherein said PCM comprises from about 10 weight % to about 70 weight % of the emulsion, based on the total weight of the emulsion.

[5]. The emulsion of [3], wherein said PCM is a blend of 2 or more compounds that undergo phase transition at different temperatures, and wherein the PCM having a lower heat of fusion is from about 1 weight % to about 85 weight %, based on the total weight of the phase change materials, and the remaining weight % of the PCM in the emulsion comprises a PCM having a relatively higher heat of fusion.

[6]. The emulsion of [2], wherein the solid carrier is a modified cyclodextrin having a degree of substitution (DS) of from 0.3 to 3, and the functional moiety is selected from acetate, n-propionate, isopropionate, n-butyrate, isobutyrate and mixed functionality.

[7]. The emulsion of [2], wherein said PCM comprises from about 10 weight % to about 70 weight % of the emulsion, based on the total weight of the emulsion.

[8]. The emulsion of [1], wherein the amount of component (a) is from about 0.10 to about 0.8, the amount of component (b) is from about 0.1 to about 0.8, and the amount of component (c) is from about 0.03 to about 0.50, wherein the amounts are weight ratios based on the total weight of the emulsion.

[9]. The emulsion of [1], wherein said modified cyclodextrin functionality is selected from ester (—OOCR), ether (—OR), urethane (—OOCNHR), and carbonate (—OOCOR), and wherein R is a straight, branched, or cyclic alkyl group having up to and including 20 carbon atoms.

[10]. The emulsion of [9], wherein said modified cyclodextrin functionality comprises —RCOO— wherein R is selected from straight, branched or cyclic alkyl or alkoxy groups having from 1 to 20 carbon atoms.

[11]. The emulsion of [1], wherein said modified cyclodextrin comprises α-cyclodextrin acetate.

[12]. The emulsion of [1] wherein said fluid medium is selected from the group consisting of water, propylene glycol, ethylene glycol, ester alcohols, glycol ether solvents, isopropyl alcohol, ethanol, methanol, mineral spirits, 2,2,4-trimethyl-1,3-pentanediol, and mixtures thereof.

[13]. A modified surface coating or paint comprising:
 a. from about 10 to about 99 weight % of a base coating; and
 b. from about 1 to about 90 weight % of a stable emulsion comprising:
  i. a fluid medium;
  ii. a phase change material (PCM) comprising straight, branched and/or cyclic aliphatic moiety having from 3 to 18 carbon atoms, polymers, and copolymers comprising residues of said straight, branched and/or cyclic aliphatic moiety; and
  iii. a modified cyclodextrin having at least one functional moiety capable of forming a stable emulsion with the PCM in said fluid medium and said base coating formulation.

[14]. The modified surface coating of [13], wherein said PCM is selected from the group consisting of paraffin based materials, esters of fatty acids and mixtures thereof.

[15]. The modified surface coating of [13], wherein said PCM is selected from the group consisting of pentadecane, hexadecane, heptadecane, octadecane, nanodecane, dodecane, icosane, methyl palmitate, ethyl palmitate, and mixtures thereof.

[16]. The modified surface coating of [13], wherein said PCM comprises from about 10 weight % to about 70 weight % of the emulsion, based on the total weight of the emulsion.

[17]. The modified surface coating of [13], wherein the solid carrier is a modified cyclodextrin having a degree of substitution (DS) of from 0.3 to 3, and the functional moiety is selected from acetate, n-propionate, isopropionate, n-butyrate, isobutyrate and mixed functionality.

[18]. The modified surface coating of [13], wherein the amount of component (i) is from about 0.10 to about 0.8, the amount of component (ii) is from about 0.1 to about 0.8, and the amount of component (iii) is from about 0.03 to about 0.50, wherein the amounts are weight ratios based on the total weight of the emulsion.

[19]. The modified surface coating of [13], wherein said fluid medium is selected from the group consisting of water, propylene glycol, ethylene glycol, ester alcohols, glycol ether solvents, isopropyl alcohol, ethanol, methanol, mineral spirits, 2,2,4-trimethyl-1,3-pentanediol, and mixtures thereof.

[20]. The modified surface coating of [13], wherein the coating has from about 5 weight % to about 50 weight % of the PCM admixed into the paint formulation.

[21]. The modified surface coating of [13], wherein the base coating is a water-based paint.

[22]. A coated substrate having a passive energy well for storing and releasing thermal energy comprising:
 A. a first surface exposed to heat source; and
 B. coated on the first surface a sufficient amount of the modified surface coating or paint composition comprising:
  i. from about 10 to about 99 weight % of a base coating; and
  ii. from about 1 to about 90 weight % of a stable emulsion comprising:
   a. a fluid medium;
   b. a phase change material (PCM) comprising straight, branched and/or cyclic aliphatic moiety having from 3 to 18 carbon atoms, polymers, and copolymers comprising residues of said straight, branched and/or cyclic aliphatic moiety; and c. a modified cyclodextrin having at least one functional moiety capable of forming a stable emulsion with the PCM in said fluid medium and said base coating formulation, wherein said first surface can absorb/release at least about 226 Joules of energy over a surface area of 400 ft$^2$ in a 24 hour period when the temperature of the surroundings is ±2° of the PCM latent heat of fusion phase change temperature.

[23]. The coated substrate of [22], wherein said base coating is a water-based paint.

[24]. The coated substrate of [22], wherein said modified surface coating or paint composition has a weight ratio of emulsion-to-base paint of from 0.50:1.

[25]. The coated substrate of [22], wherein said modified surface coating or paint composition has a weight ratio of emulsion-to-base paint of from 1:1.

[26]. The coated substrate of [22], wherein said first coated surface comprises a plurality of coats of modified surface coatings, wherein a first layer comprises first modified coating having a first PCM with a first heat of fusion and a second layer comprises a second modified coating having a second PCM with a second heat of fusion, wherein the second heat of fusion is different than the first heat of fusion.

[27]. The coated substrate of [26], wherein said first PCM has a heat of fusion greater than the second PCM.

[28]. The coated substrate of [26], wherein said first PCM has a heat of fusion less than the second PCM.

These and other objects and advantages of the present invention will become more apparent to those skilled in the art in view of the following description and the accompanying drawings. It is to be understood that the inventive concept is not to be considered limited to the constructions disclosed herein but instead by the scope of the appended claims.

DETAILED DESCRIPTION OF THE INVENTION

Figure 1:
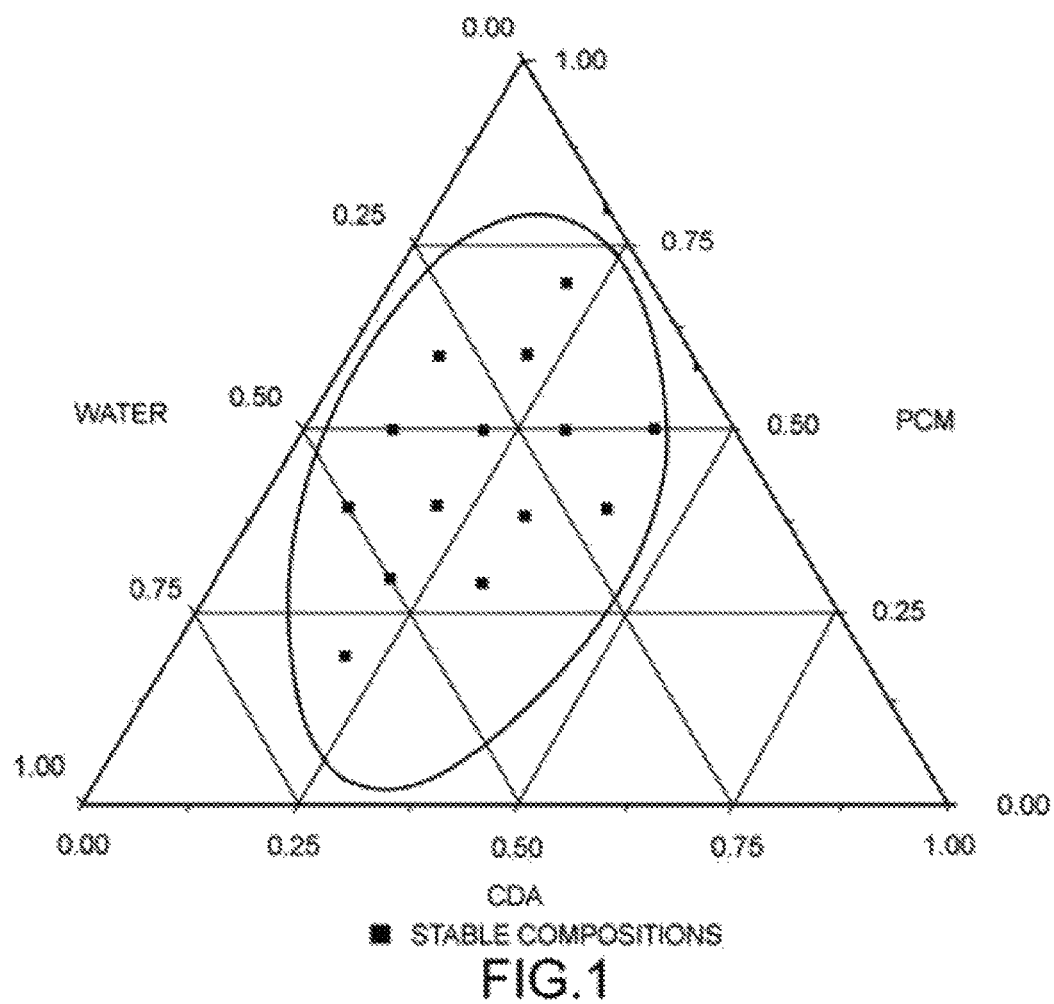
FIG. 1 is a phase diagram illustrating the ternary components of water, α-cyclodextrin acetate and PCM where stable emulsion compositions are within the oval boundary.

In accordance with one aspect of the present invention, it has been found that a stable phase change emulsion can be formed comprising: a fluid medium; a phase change material (PCM) and a solid carrier selected from a cyclic oligosaccharide, a cyclodextrin and mixtures thereof wherein the carrier includes at least one functional moiety capable of forming a stable emulsion with the PCM in the fluid medium. As used herein, the term "stable emulsion" is defined as the emulsion having less than 10%, or less than 5%, or less than 2% solids precipitation for at least 8 hours, undisturbed, and at a temperature of from about 22° C. to about 25° C.

In another aspect of the invention, the phase change emulsion comprises: a fluid medium, a phase change material selected from a straight, branched and/or cyclic aliphatic moiety having from 3 to 18 carbon atoms, polymers, and copolymers comprising residues of straight, branched and/or cyclic aliphatic moiety having from 3 to 18 carbon atoms; and a carrier selected from a modified cyclodextrin having at least one functional moiety capable of forming an emulsion with the PCM in the fluid medium.

Suitable fluids that may be used as a medium in preparing the phase change emulsion can be selected from water, hydrophilic and hydrophobic compounds that are in a liquid phase at temperatures of from about −10° C. to about 40° C., or in a liquid phase at temperatures of from about −5° C. to about 30° C., or in a liquid phase at temperatures of from about 0° C. to about 28° C. Suitable fluidic mediums include water, propylene glycol, ethylene glycol, ester alcohols, glycol ether solvents, isopropyl alcohol, ethanol, methanol, mineral spirits, 2,2,4-trimethyl-1,3-pentanediol and mixtures thereof.

Phase change materials suitable for use in the present invention comprise straight, branched and/or cyclic aliphatic molecules having from 3 to 18 carbon atoms, polymers, and copolymers comprising residues of the straight, branched and/or cyclic aliphatic moiety having from 3 to 18 carbon atoms and having a stable thermal signature. As used herein, the term "stable thermal signature" means those molecules or compounds that will melt and solidify repeatedly over at least 100 cycles within a predetermined temperature with less than about a 5° C. variance over the 100 cycles. Non-limiting examples of such PCMs include paraffin compounds such as pentadecane, hexadecane, heptadecane, octadecane, nanodecane, icosane; fatty acid esters, such as, methyl palmitate, and ethyl palmitate, and mixtures of these compounds. The phase change material may be a single compound, a homogeneous eutectic mix of multiple compounds like paraffin wax or a homogeneous mixture comprising of 2 or more compounds that can undergo phase transition at different temperatures.

In such blends having multiple PCM with different phase change temperatures, the PCM having a lower heat of fusion, and therefore a lower temperature for phase change from solid to gel or liquid, can be from about 1 weight % to about 85 weight %, based on the total weight of the phase change materials, or from about 2 to about 80 weight %, or from about 3 to about 75 weight %, or from about 4 to about 70 weight %, or from about 5 to about 65 weight %, or from about 10 to about 65 weight %, or from about 15 to about 65 weight %, or from about 20 to about 65 weight %, or from about 25 to about 65 weight %, with the PCM having a higher phase change temperature being the remainder of the PCM compounds. In such blends where two or more phase change materials are utilized, the above weight percentages are based on the total weight of the PCM in the blend.

As used herein the term "residue" refers to the moiety that is the resulting product of the chemical species in a particular reaction scheme or subsequent formulation or chemical product, regardless of whether the moiety is actually obtained from the chemical species. Such term is well understood by those skilled in the art.

Another component of the stable emulsion is a solid carrier useful as a stabilizing agent or emulsifier and that includes least one functional moiety capable of forming a stable emulsion with the PCM in the fluid medium. A suitable solid carrier comprises a cyclic oligosaccharide, a cyclodextrin and mixtures thereof having at least one functional moiety capable of forming a stable emulsion with the PCM in the desired fluidic medium. Cyclodextrins typically contain a number of glucose monomers ranging from six to eight units in a ring, which are named α-cyclodextrin (6 units), β-cyclodextrin (7 units), and γ-cyclodextrin (8 units) respectively. In one embodiment, the modified cyclodextrins suitable for this invention include modified α-cyclodextrin, modified β-cyclodextrin, and modified γ-cyclodextrin having at least one functionality selected from ester (—OOCR), ether (—OR), urethane (—OOCNHR), and carbonate (—OOCOR), wherein R is an alkyl group having up to and including 20 carbon atoms and which may be straight, branched, or cyclic.

The modified cyclodextrin of the invention is typically prepared by reacting the hydroxyl (—OH) groups on cyclodextrin to obtain the desirable functionality. In one aspect, the hydroxyl groups are substituted with ester groups. Since there are three hydroxyl groups on each glucose unit capable of substitution, the degree of substitution (DS) may be 1, 2, or 3 on each unit. For example, when two of the three OH groups on each glucose unit are substituted with acetate (Ac) groups, DS(Ac)=2. Thus, a modified cyclodextrin may have an average DS ranging from >0 to 3. The desirable degree of substitution (DS) of the modified cyclodextrin of the invention is from about 0.3 to 3, or from 0.5 to 3, or from 1 to 3, or from 1.5 to 3, or from 1.8 to 3, or from 2.0 to 3, or from 2.2 to 3, or from 2.5 to 3. Desirably, the DS would be greater than 1.8, or greater than 2.0, or greater than 2.2, or greater than 2.5.

In another aspect, the modified cyclodextrin comprises at least one ester group selected from acetate, n-propionate, isopropionate, n-butyrate, isobutyrate and mixed functionality. In yet another aspect, the modified cyclodextrin of the invention is a modified β-cyclodextrin having at least one functional ester group selected from acetate, n-propionate, isopropionate, n-butyrate, and isobutyrate and having DS ranging from about 2.5 to about 3. A mixed functionality cyclodextrin may be prepared using methods known to those skilled in the art.

Methods for preparing modified cyclodextrins are well known to those skilled in the art and are further described in U.S. Pat. No. 6,479,467 B1, the entire disclosure of which is incorporated herein by reference.

In forming the stable emulsion one or more of the aforementioned PCMs in a liquid state, and functionalized cyclodextrin are admixed together in the fluidic medium. The amount of (a) fluidic medium can be from 0.10, 0.15, 0.20, 0.25, 0.30, 0.35, 0.40, 0.45, 0.50, 0.55, 0.60, 0.65, 0.70, 0.75 or 0.80, based on the weight fraction of the total components in the emulsion, the sum of which equals 1. The amount of (b) PCM in the emulsion can be from 0.10, 0.15, 0.20, 0.25, 0.30, 0.35, 0.40, 0.45, 0.50, 0.55, 0.60, 0.65, 0.70, 0.75 or 0.80, based on the weight fraction of the total components in the emulsion, the sum of which equals 1. The amount of (c) functionalized cyclodextrin in the emulsion can be from 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50, based on the weight fraction of the total components in the emulsion, the sum of which equals 1. Accordingly, the amount of component (a) can be from about 0.10 to about 0.8, the amount of component (b) can be from about 0.1 to about 0.8, and the amount of component (c) can be from about 0.03 to about 0.50, wherein the amounts are weight fractions based on the total weight of the emulsion and the sum of which equals 1. It will be understood by those skilled in the art that the above weight fractions include all fractions in between those specifically delineated. It is further understood that the amounts of fluid medium, PCM and functionalized cyclodextrin in the emulsion are independently selected from the above amounts with the stipulation that the sum of the weight fraction of the constituents in the emulsion equals 1.

In another aspect, the emulsion includes: from about 1 to about 80 weight %, or about 10 to about 80 weight %, or about 20 to about 80 weight %, or about 30 to 80 weight %, or about 40 to 80 weight %, or about 50 to about 80 weight %, or about 10 to about 70 weight %, or about 20 to about 70 weight %, or about 30 to about 70 weight %, or about 40 to about 70 weight %, or about 50 to about 70 weight %, or about 10 to about 60 weight %, or about 20 to about 60 weight %, or about 30 to 60 weight %, or about 40 to 60 weight %, or about 50 to about 60 weight %, or about 10 to about 50 weight %, or about 20 to about 50 weight %, or about 30 to about 50 weight %, or about 40 to about 50 weight %, of the PCM; from about from about 1 to about 80 weight %, or about 10 to about 80 weight %, or about 20 to about 80 weight %, or about 30 to 80 weight %, or about 40 to 80 weight %, or about 50 to about 80 weight %, or about 10 to about 70 weight %, or about 20 to about 70 weight %, or about 30 to about 70 weight %, or about 40 to about 70 weight %, or about 50 to about 70 weight %, or about 10 to about 60 weight %, or about 20 to about 60 weight %, or about 30 to 60 weight %, or about 40 to 60 weight %, or about 50 to about 60 weight %, or about 10 to about 50 weight %, or about 20 to about 50 weight %, or about 30 to about 50 weight %, or about 40 to about 50 weight %, of the fluidic medium; and from about 3 weight % to about 50 weight %, or about 4 weight % to about 50 weight %, or about 5 weight % to about 50 weight % or about 6 weight % to about 50 weight %, or about 7 weight % to about 50 weight %, or about 8 weight % to about 50 weight %, or about 10 to about 50 weight %, or about 15 weight % to about 50 weight %, or about 20 to about 50 weight %, or about 25 weight % to about 50 weight %, or about 30 to about 50 weight %, or about 35 weight % to about 50 weight % of the modified cyclodextrin.

The components are admixed together under appropriate shear conditions to form the stable emulsion. Generally, the mixture is sheered at a speed of from about 100 to 7000 rpm using a Omni Macro homogenizer having a blade or paddle with a pitch of from about 2 to about 6 degrees. The temperature of the admixture during sheering is from about 25° C. to about 200° C., or from about 35° C. to about 150° C., or from about 40° C. to about 125° C. or from about 10° C. to 100° C. above the PCM melting point, or from about 25° C. to about 75° C. above the PCM melting point, or from about 35° C. to about 60° C. above the PCM melting point.

Another aspect of the present invention is for a modified surface coating composition having latent thermal properties formed by admixing a pigmented or non-pigmented base formulation and the phase change emulsion comprising: a carrier fluid; a PCM comprising a straight, branched and/or cyclic aliphatic moiety having from 3 to 18 carbon atoms, polymers, and copolymers comprising residues of said straight, branched and/or cyclic aliphatic moiety; and a solid cyclodextrin having at least one functional moiety capable of forming a stable emulsion with the PCM in the fluid medium. It has been discovered that by incorporating such phase change emulsion into a base surface coating formulation the resulting coating formulation is useful as a phase change material for climate control, deicing, or in active solar energy storage systems. Advantageously, the present invention does not require substantial modification of the structure or its interior to achieve thermal energy conservation.

In one aspect of the invention, it has been found that the phase change emulsion can be dispersed in a water-based, pigmented or non-pigmented paint composition and used to form a coated surface or coated products in which the PCM maintains its melting point and heat of fusion and function effectively as passive thermal energy storage.

Base coating compositions can be water-based latex formulations selected from acrylic latex, polyester emulsion, polyester dispersion, alkyd emulsion, alkyd dispersion, polyurethane dispersion, epoxy emulsion/dispersions. Such water-based latex formulations are commercially available, and may contain additives such as pigments, anti-fungal components, flow control components, cross-linking agents, and UV inhibitors as is also known to those skilled in the coatings art.

The phase change emulsion incorporated into the base paint formulation, whether water-based or oil-based described above, can have a weight ratio by parts of emulsion-to-base paint of from about 0.01:1, or from about 0.02:1, or from about 0.03:1, or from about 0.04:1, or from about 0.05:1, or from about 0.06:1, or from about 0.07:1, or from about 0.08:1, or from about 0.09:1, or from about 0.10:1, or from about 0.11:1, or from about 0.12:1, or from about 0.13:1, or from about 0.14:1, or from about 0.15:1, or from about 0.16:1, or from about 0.17:1, or from about 0.18:1, or from about 0.19:1, or from about 0.20:1, or from about 0.21:1, or from about 0.22:1, or from about 0.23:1, or from about 0.24:1, or from about 0.25:1, or from about 0.26:1, or from about 0.27:1, or from about 0.28:1, or from about 0.29:1, or from about 0.30:1, or from about 0.31:1, or from about 0.32:1, or from about 0.33:1, or from about 0.34:1, or from about 0.35:1, or from about 0.36:1, or from about 0.37:1, or from about 0.38:1, or from about 0.39:1, or from about 0.40:1, or from about 0.41:1, or from about 0.42:1, or from about 0.43:1, or from about 0.44:1, or from about 0.45:1, or from about 0.46:1, or from about 0.47:1, or from about 0.48:1, or from about 0.49:1, or from about 0.50:1, or from about 0.51:1, or from about 0.52:1, or from about 0.53:1, or from about 0.54:1, or from about 0.55:1, or from about 0.56:1, or from about 0.57:1, or from about 0.58:1, or from about 0.59:1, or from about 0.60:1, or from about 0.61:1, or from about 0.62:1, or from about 0.63:1, or from about 0.64:1, or from about 0.65:1, or from about 0.66:1, or from about 0.67:1, or from about 0.68:1, or from about 0.69:1, or from about 0.70:1, or from about 0.71:1, or from about 0.72:1, or from about 0.73:1, or from about 0.74:1, or from about 0.75:1, or from about 0.76:1, or from about 0.77:1, or from about 0.78:1, or from about 0.79:1, or from about 0.80:1, or from about 0.81:1, or from about 0.82:1, or from about 0.83:1, or from about 0.84:1, or from about 0.85:1, or from about 0.86:1, or from about 0.87:1, or from about 0.88:1, or from about 0.89:1, or from about 0.90:1, or from about 0.91:1, or from about 0.92:1, or from about 0.93:1, or from about 0.94:1, or from about 0.95:1, or from about 0.96:1, or from about 0.97:1, or from about 0.98:1, or from about 0.99:1, or from about 1:1, or from about 1.2:1, or about 1.3:1, or about 1.4:1, or about 1.5:1, or about 1.6:1, or about 1.7:1, or about 1.8:1, or about 1.9:1, or about 2:1, or from about 2.2:1, or about 2.3:1, or about 2.4:1, or about 2.5:1, or about 2.6:1, or about 2.7:1, or about 2.8:1, or about 2.9:1, or about 3:1, or from about 3.2:1, or about 3.3:1, or about 3.4:1, or about 3.5:1, or about 3.6:1, or about 3.7:1, or about 3.8:1, or about 3.9:1, or about 4:1, or from about 4.2:1, or about 4.3:1, or about 4.4:1, or about 4.5:1, or about 4.6:1, or about 4.7:1, or about 4.8:1, or about 4.9:1, or about 5:1, or from about 6:1, or from about 6.5:1, or from about 7:1, or from about 7.5:1, or from about 8:1, or from about 8.5:1, or from about 9:1, or from about 9.5:1, or from about 10:1.

Alternatively, the modified surface coating or paint can have from about 10 to about 99 weight % of the base coating formulation and from about 1 to about 90 weight % of the phase change emulsion admixed therein, wherein the weight % is based on the total weight of the modified paint; or the modified surface coating or paint can have from about 20 to about 80 weight % of the base coating formulation and from about 20 to about 80 weight % of the phase change emulsion admixed therein; or the modified surface coating or paint can have from about 30 to about 70 weight % of the base coating formulation and from about 30 to about 70 weight % of the phase change emulsion admixed therein; or the modified surface coating or paint can have from about 40 to about 60 weight % of the base coating formulation and from about 40 to about 60 weight % of the phase change emulsion admixed therein; or the modified surface coating or paint can have from about 50 weight % of the base coating formulation and from about 50 weight % of the phase change emulsion admixed therein, wherein the weight % is based on the total weight of the modified paint.

In another aspect, the modified paint formulation can further have from about 1 weight %, to about 60 weight % of the PCM admixed into the paint formulation, or the modified paint formulation can have from about 5 weight % to about 50 weight % of the PCM admixed into the paint formulation, or the modified paint formulation can have from about 5 weight % to about 45 weight % of the PCM admixed into the paint formulation, or the modified paint formulation can have from about 7 weight % to about 40 weight % of the PCM admixed into the paint formulation, or the modified paint formulation can have from about 7 weight % to about 35 weight % of the PCM admixed into the paint formulation, or the modified paint formulation can have from about 7 weight % to about 30 weight % of the PCM admixed into the paint formulation, wherein the above weight percentages are based on the total weight of the base paint and the weight of the phase change emulsion in the modified coating.

In another aspect of the present invention is for a coated substrate having a passive energy well for storing and releasing thermal energy. The coated substrate having a first surface exposed to a heat source and coated on the first surface a sufficient amount of the modified surface coating or paint composition described above having the stable emulsion comprising: (a) a fluid medium; (b) a phase change material (PCM) comprising straight, branched and/or cyclic aliphatic moiety having from 3 to 18 carbon atoms, polymers, and copolymers comprising residues of said straight, branched and/or cyclic aliphatic moiety; and (c) a solid carrier selected from the group consisting of a cyclic oligosaccharide, a modified cyclodextrin and mixtures thereof having at least one functional moiety capable of forming a stable emulsion with the PCM in the fluid medium to absorb/release at least about 226 Joules of energy over a surface area of 400 ft2 in a 24 hour period when the temperature of the surroundings is ±2° of the PCM latent heat of fusion phase change temperature.

The modified surface coating or paint composition includes from about 10 to about 99 weight % of a base coating and from about 1 to about 90 weight % of the stable emulsion described above, the descriptions of which are fully incorporated into this aspect of the invention and not repeated herein for brevity.

Advantageously, the modified coating or paint of the present invention can be customized to meet particular architectural needs. That is, the coated surface of a substrate can have a plurality of coats of modified surface coatings, wherein a first layer comprises first modified coating having a first PCM with a first heat of fusion and a second layer comprises a second modified coating having a second PCM with a second heat of fusion, such that the second heat of fusion is different than the first heat of fusion. Accordingly, the coated surface can have a first PCM with a heat of fusion greater than the second PCM, or alternatively, the coated surface can have a first PCM with a heat of fusion less than the second PCM.

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a volume basis unless otherwise stated.

Comparative Example 1

Multiple samples of pamolyn tall oil fatty acid were evaluated using Differential Scanning Calorimetry (Perkin Elmer) to obtain melting point and heat of fusion values. It was determined that pamolyn tall oil fatty acid would not be a suitable material as a phase change material since the results were not consistent, (melting point varying between 27° C. to 40° C.) as well as the samples showed multiple melting points ranging from 3° C. to 50° C.

Comparative Example 2

Undecanoic acid is a fatty acid with sharp melting point at 28° C. with high heats of fusion (1341.9 Kj/Kg). Direct mixing of Undecanoic acid in a commercially available semi-gloss paint was evaluated. Udecanoic acid (1 gram) was mixed with the semi-gloss paint (10 grams). Precipitation of paint solids was observed. The paint lost its functionality. The concentration of undecanoic acid incorporated in the paint was then reduced to 0.5 gm in 10 gm of paint and a similar precipitation of solids was observed.

Comparative Example 3

Emulsions of undecanoic acid, water and cyclodextrin acetate (ratios 2:7:1, 3:6:1, 4:5:1, 5:4:1, 6:3:1, 5:3:2, 6:2:2, 4:4:2, 3:5:2) parts by weight were prepared using the following method. Using the above weight ratios, the components were weighed in a glass jar and heated to 50° C. at a rate of about 3 to 5° C./minute over about a 20 minute time interval. The emulsion was prepared under constant stirring using an Omni homogenizer with 6 pitch blade at a speed of about 800 RPM until a stable single phase was achieved. The weight ratios were based on the total weight of the emulsion.

The emulsion was allowed to cool and equal parts, by weight, of stable emulsion were mixed with equal parts, by weight, of a base paint. It was observed that the paint solids precipitated slowly when the amount of undecanoic acid increased above 3 weight % of the final paint composition.

Comparative Example 4

Calcium chloride hexahydrate is a salt hydrate with a melting point of 30° C. and a heat of fusion of (135 Kilojoules/Kilogram). Salt hydrates have the problem of super cooling and hence further investigation to understand the behavior was not pursued.

Comparative Example 5

Octadecane ($T_m$–28° C. and heat of fusion ~224 Kj/Kg) was chosen as the PCM compound. Several techniques were explored to incorporate octadecane in a surface coating. The base paint was a mid or semi-gloss white direct-to-metal topcoat formulation.

The ingredients were first mixed in the order listed in Table 1 below. The ingredients listed under Grind were mixed at high speed of about 2000 rpm using a high shear tooth blade. The ingredients listed in letdown portion of the table were subsequently mixed using a sheer mixer and adding the ingredients and the respective amounts to the mix individually in the order listed in Table 1. Octadecane was melted at 35° C., weighed and added to the paint till solids were starting to separate from the coalescence mixture. The maximum amount of Octadecane that could be added without destroying the integrity of the paint was 60 grams. The formulated paint was then transferred into a paint can and sealed with lid and stored for use.

TABLE 1

| Grind | Weight, gm |
|---|---|
| DPM | 18 |
| Water | 35 |
| Tamol 165 | 9.5 |
| Aqueous Ammonia (28%) | 1.0 |
| Triton 1488 | 1.5 |
| Ti-Pure R-706 | 1.5 |
| Water | 5 |
| Letdown | |
| MAINCOTE HG-56 | 523 |
| Aqueous ammonia | 4 |
| Premix and then add | |
| PDnB | 55 |
| Water | 85 |
| Dibutyl Phthalate | 14 |
| Tego 1488 | 2.5 |
| Sodium Nitrate | 9 |
| Acrysol RM-8W | 3 |
| Octadecane | 60 |

Three different types of commercially available surfactants that are commonly used in coatings: a) Triton; b Tergitol; and c) Ecosurf (all available from The Dow Chemical Company), were evaluated for making emulsions that can then be incorporated into the base paint coating. For the initial preliminary study an emulsion of water, octadecane using one of the surfactants was made and then mixed with equal parts of the base paint. The concentration of surfactant used was limited to the amount of surfactant added to the base paint formulation, which generally varies between 1.5-2% by wet weight and the same levels were used for making emulsions. Standard oil in water emulsion mix in weight ratio of 1:2 along with 1.5 weight % of desired surfactant was mixed using an Omni Macro homogenizer at about 7000 rpm. In order to keep the octadecane in the liquid phase, the mixture was heated to 50° C. when preparing the emulsion. The prepared emulsion contained approximately 33%±2% by weight of octadecane. When this emulsion was added to the paint, at an octadecane loading of about 16.5 wet weight %, based on the total weight of the base paint and the emulsion, a coarse suspension of octadecane resulted which eventually phase separated from the base paint. In order to make a stable mixture, the octadecane concentration in the final paint formulation was reduced to about 8 wet weight %, based on the total weight of the base paint and the emulsion. This lead to formation of a stable paint incorporating the PCM. However, over about ten (10) days, visual inspection revealed coarse crystals present in the paint indicating a non-homogeneous mixture.

Comparative Example 6

Pickering emulsions using three cellulose esters: 1) cellulose diacetate; 2) cellulose acetate butyrate; and 3) cellulose acetate propionate (all available from Eastman Chemical Company) were explored as potential solid emulsifying/encapsulating agents. Formulations with different ratios of raw materials were prepared in accordance with the procedure described in comparative example 3 wherein the ingredients (water, octadecane and emulsifying solid) were prepared in the ratios provided in Table 2. None of the formulations formed a single homogeneous phase and were considered unstable. The cellulose esters were deemed unusable for this purpose.

Comparative Example 7

Raw cyclodextrin (available from Wacker Chemie) was evaluated as an option to make a Pickering emulsion. Cyclodextrins (sometimes called cycloamyloses) are a family of compounds made up of sugar molecules bound together in a ring (cyclic oligosaccharides). Cyclodextrins are produced from starch using enzymatic conversion. Cyclodextrins are used in food, pharmaceutical, drug delivery, and chemical industries, as well as agriculture and environmental engineering. Cyclodextrins are composed of five or more α-D-glucopyranoside units linked 1→4, as in amylose (a fragment of starch). Typical cyclodextrins contain a number of glucose monomers ranging from six to eight units in a ring. Using α-cyclodextrin as an emulsifying agent, emulsions were made with concentrations of octadecane, water and α-cyclodextrin in the ratios 2:7:1, 3:6:1, 4:5:1, 5:4:1, 6:3:1, 5:3:2, 6:2:2, 4:4:2, 3:5:2, respectively, using the same method as described above in Comparative Example 3. It was found that emulsions 3:6:1, 4:5:1, 5:4:1, 6:3:1, 5:3:2, 6:2:2, 4:4:2, 3:5:2 were independently stable, but they did not incorporate well with the base paint, resulting in precipitation of oil and settling of paint solids was observed at ratios above 25% of octadecane by weight of final paint and 2% of cyclodextrin by weight of final paint. Accordingly, α-cyclodextrin was concluded as being unsuitable for this application.

Example 8

Pickering emulsions using a modified α-cyclodextrin (α-cyclodextrin acetate) molecules, available from Eastman Chemical Company, as an emulsifier and stabilizing agent were made using varying weight fractions as specified in Table 2 below. All amounts are on a weight fraction basis of the constituents: water, α-cyclodextrin acetate (α-CDA) and octadecane.

In a 200 ml glass beaker, the specified quantities (on a weight basis) of water, octadecane and cyclodextrin acetate were weighed and mixed. The beaker containing each mixture was placed on a heating mantel and heated to 50° C. for a period of 20 minutes. Using an Omni macro homogenizer, the blade was inserted into the beaker and shearing the mixture by mixing at 7000 rpm for 20 minutes. The mixture was removed from the heating mantel and allowed to cool to room temperature.

TABLE 2

| Emulsion No. | CDA | Octadecane | Water | Stable |
|---|---|---|---|---|
| 1 | 0.05 | 0.95 | 0 | NS |
| 2 | 0.05 | 0.85 | 0.1 | NS |
| 3 | 0.05 | 0.75 | 0.2 | NS |
| 4 | 0.05 | 0.65 | 0.3 | S |
| 5 | 0.05 | 0.55 | 0.4 | S |
| 6 | 0.05 | 0.45 | 0.5 | S |
| 7 | 0.05 | 0.35 | 0.6 | S |
| 8 | 0.05 | 0.25 | 0.7 | NS |
| 9 | 0.1 | 0.9 | 0 | NS |
| 10 | 0.1 | 0.8 | 0.1 | NS |
| 11 | 0.1 | 0.7 | 0.2 | NS |
| 12 | 0.1 | 0.6 | 0.3 | S |
| 13 | 0.1 | 0.5 | 0.4 | S |
| 14 | 0.1 | 0.4 | 0.5 | S |
| 15 | 0.1 | 0.3 | 0.6 | S |
| 16 | 0.1 | 0.2 | 0.7 | NS |
| 17 | 0.1 | 0.1 | 0.8 | NS |
| 18 | 0.1 | 0 | 0.9 | NS |
| 19 | 0.2 | 0.8 | 0 | NS |
| 20 | 0.2 | 0.7 | 0.1 | NS |
| 21 | 0.2 | 0.6 | 0.2 | S |
| 22 | 0.2 | 0.5 | 0.3 | S |
| 23 | 0.2 | 0.4 | 0.4 | S |
| 24 | 0.2 | 0.3 | 0.5 | S |
| 25 | 0.2 | 0.2 | 0.6 | NS |
| 26 | 0.2 | 0.1 | 0.7 | NS |
| 27 | 0.2 | 0 | 0.8 | NS |
| 28 | 0.3 | 0.7 | 0 | NS |
| 29 | 0.3 | 0.6 | 0.1 | S |
| 30 | 0.3 | 0.5 | 0.2 | S |
| 31 | 0.3 | 0.4 | 0.3 | S |
| 32 | 0.3 | 0.3 | 0.4 | S |
| 33 | 0.3 | 0.2 | 0.5 | NS |
| 34 | 0.3 | 0.1 | 0.6 | NS |
| 35 | 0.3 | 0 | 0.7 | NS |
| 36 | 0.4 | 0.6 | 0 | NS |
| 37 | 0.4 | 0.5 | 0.1 | S |
| 38 | 0.4 | 0.4 | 0.2 | S |
| 39 | 0.4 | 0.3 | 0.3 | S |
| 40 | 0.4 | 0.2 | 0.4 | S |
| 41 | 0.4 | 0.1 | 0.5 | NS |
| 42 | 0.5 | 0.5 | 0 | NS |
| 43 | 0.5 | 0.4 | 0.1 | NS |
| 44 | 0.5 | 0.3 | 0.2 | S |
| 45 | 0.5 | 0.2 | 0.3 | S |
| 46 | 0.5 | 0.1 | 0.4 | S |

*Stable emulsion was identified by visual verification.
S—stable; NS—not stable.

The ternary phase diagram of FIG. 1 illustrates the regions were stable emulsions were achieved. Stable emulsions had single phase and produced spherical particles. Stable emulsions having the least amount of α-cyclodextrin acetate molecules and largest amount of octadecane were chosen and incorporated in the commercially available semi-gloss base paint identified above at a ratio of 1:1 PCM emulsion to paint. Stable paint/emulsion mixtures were obtained and samples were analyzed using Differential Scanning Calorimetry (DSC (Perkin Elmer)) in accordance with ASTM Method D3418. The melting and freezing points of the final, modified PCM paint when dried was found to be about 28.5° C. and 25.7° C., respectively, and having a heat of fusion of about 125 Kj/Kg, (phase change energy) as determined by Differential Scanning Calorimetry ASTM Method D3418.

Example 9

Figure 2:
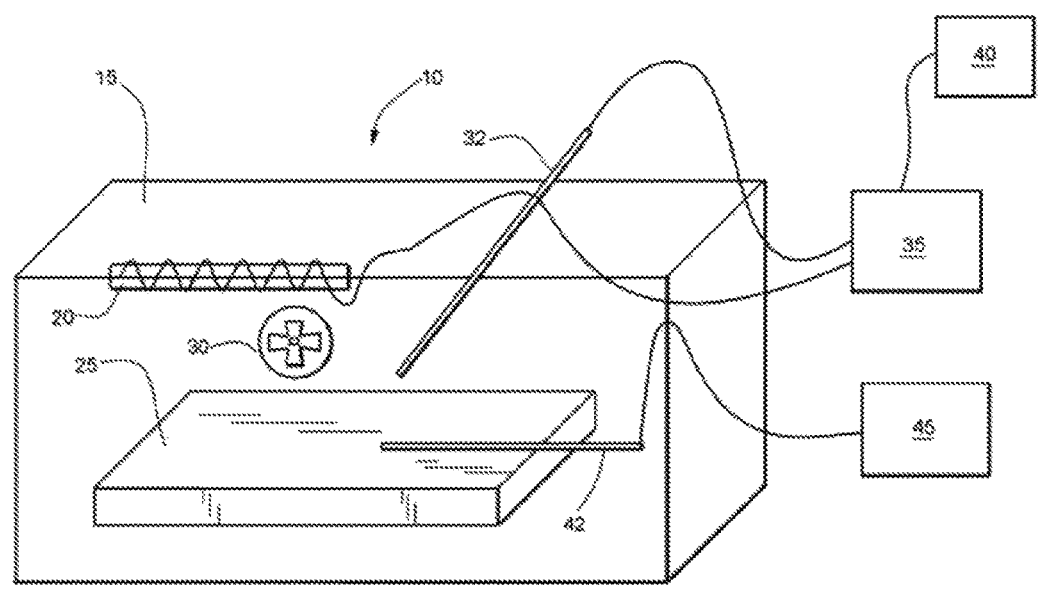
FIG. 2 is a depiction of an apparatus for testing the energy absorption/release for various gypsum boards having a predetermined painted surface area and having a specified amount of PCM incorporated into the base paint.

Two types of energy absorption tests were conducted to understand the energy absorption capabilities of gypsum wallboards coated with modified paint containing phase change materials in accordance with the present invention. Four identical pieces of gypsum wallboard (available from Lowes) measuring ½ inch (12.7 millimeters) thick by 6 inches (15.24 cm) wide by 8 inches long were each coated with paints containing levels of phase change materials ranging from 0 weight %, 6 weight %, 20 weight % and 30 weight % (on a wet weight basis) of octadecane (PCM) having a melting point of about 28.5° C. The gypsum boards were taped with a thermocouple to monitor surface temperature prior to painting the surface. Each test board was coated three times with the desired paint sample and labeled appropriately. Referring to FIG. 2 the apparatus testing the energy absorption/release for the painted surfaces is depicted.

The apparatus 10 comprises a glass enclosure 15 having a heat source 20, such as an electric coil or heating tape, suspended inside the enclosure. The gypsum boards 25 were placed inside identical glass chambers to minimize any thermal leakage to ambient conditions. The chambers were heated to a temperature of about 28.5° C. using the heating source 20. The air inside the chamber was circulated using a fan 30 (McMaster-Carr 1976K91). The energy absorbed to maintain the temperature at 28.5° C. (the temperature fluctuation regulated was ±0.2° C. with fluctuation regulated using a proportional control system and thermocouple 32) was calculated by connecting the heat source 20 to a temperature controller 35 through an AC power meter with data logger 40 (Wattsup? available from ThinkTank Energy products). The surface temperature of the gypsum board 25 was measured using thermocouple 42 and logged using a four-channel temperature logger 45 (HOBO Onset Corp.). Advantageously, the gypsum board 25 containing the phase change material absorbed more energy compared to a board that was painted with the unmodified base paint. Table 3 shows the energy absorption results obtained for the different gypsum boards.

TABLE 3

Energy Absorption for PCM Loadings
Watt-hour

| Time Interval hours | 0% | 6% | 23% | 30% |
|---|---|---|---|---|
| 1 | 0.3 | 0.3 | 0.0 | 3.6 |
| 2 | 13.8 | 14.9 | 3.6 | 14.9 |
| 3 | 25.0 | 27.0 | 13.3 | 31.2 |
| 4 | 35.7 | 38.5 | 27.9 | 45.3 |
| 5 | 46.3 | 49.9 | 42.0 | 59.2 |
| 6 | 57.2 | 61.7 | 55.9 | 73.9 |
| 7 | 68.1 | 73.4 | 70.4 | 88.5 |
| 8 | 79.0 | 85.2 | 85.1 | 102.7 |
| 9 | 90.2 | 97.2 | 99.3 | 117.7 |
| 10 | 101.7 | 109.6 | 114.1 | 132.9 |
| 11 | 113.0 | 121.8 | 129.3 | 148.2 |
| 12 | 124.5 | 134.2 | 144.6 | 163.9 |
| 13 | 136.0 | 146.6 | 160.2 | 179.6 |
| 14 | 147.5 | 159.0 | 175.9 | 195.5 |
| 15 | 159.1 | 171.5 | 191.7 | 211.2 |
| 16 | 170.2 | 183.5 | 207.6 | 226.3 |
| 17 | 180.9 | 195.0 | 222.8 | 240.3 |
| 17.4 | 185.4 | 199.9 | 229.2 | 246.2 |

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

What is claimed is:

1. A modified surface coating or paint comprising:
   a. from about 10 to about 99 weight % of a base coating; and
   b. from about 1 to about 90 weight % of a stable emulsion comprising:
      i. water;
      ii. a phase change material (PCM) comprising octadecane; and
      iii. a modified cyclodextrin having at least one functional moiety capable of forming a stable emulsion with the PCM in said fluid medium and said base coating formulation; wherein the at least one functional moiety is an ester group;
      wherein the amount of component (i) is from about 0.10 to about 0.8, the amount of component (ii) is from about 0.1 to about 0.8, and the amount of component (iii) is from about 0.03 to about 0.50, wherein the amounts are weight ratios based on the total weight of the emulsion.

2. The modified surface coating of claim 1, wherein said PCM comprises from about 10 weight % to about 70 weight % of the emulsion, based on the total weight of the emulsion.

3. The modified surface coating of claim 1, wherein the solid carrier is a modified cyclodextrin having a degree of substitution (DS) of from 0.3 to 3, and the ester group is selected from acetate, n-propionate, isopropionate, n-butyrate, isobutyrate and mixed functionality.

4. The modified surface coating of claim 1, wherein the coating has from about 5 weight % to about 50 weight % of the PCM admixed into the paint formulation.

5. The modified surface coating of claim 1, wherein the base coating is a water-based paint.

6. A coated substrate having a passive energy well for storing and releasing thermal energy comprising:
   A. a first surface exposed to heat source; and
   B. coated on the first surface a sufficient amount of the modified surface coating or paint composition comprising:
      i. from about 10 to about 99 weight % of a base coating; and
      ii. from about 1 to about 90 weight % of a stable emulsion comprising:
         a. water;
         b. a phase change material (PCM) comprising octadecane; and
         c. a modified cyclodextrin having at least one functional moiety capable of forming a stable emulsion with the PCM in said fluid medium and said base coating formulation; wherein the at least one functional moiety is an ester group;
      wherein the amount of component (i) is from about 0.10 to about 0.8, the amount of component (ii) is from about 0.1 to about 0.8, and the amount of component (iii) is from about 0.03 to about 0.50:
   wherein the amounts are weight ratios based on the total weight of the emulsion, wherein said first surface can absorb/release at least about 226 Joules of energy over a surface area of 400 ft² in a 24 hour period when the temperature of the surroundings is ±2° of the PCM latent heat of fusion phase change temperature; and wherein said first coated surface comprises a plurality of coats of modified surface coatings, wherein a first layer comprises first modified coating having a first PCM with a first heat of fusion and a second layer comprises a second modified coating having a second PCM with a second heat of fusion, wherein the second heat of fusion is different than the first heat of fusion.

7. The coated substrate of claim 6, wherein said base coating is a water-based paint.

8. The coated substrate of claim 6, wherein said modified surface coating or paint composition has a weight ratio of emulsion-to-base paint of from 0.01:1 to 10:1.

9. The coated substrate of claim 6, wherein said modified surface coating or paint composition has a weight ratio of emulsion-to-base paint of 1:1.

10. The coated substrate of claim 6, wherein said first PCM has a heat of fusion greater than the second PCM.

11. The coated substrate of claim 6, wherein said first PCM has a heat of fusion less than the second PCM.

* * * * *